United States Patent [19]

Meyer et al.

[11] Patent Number: 4,508,353

[45] Date of Patent: Apr. 2, 1985

[54] IMAGE MATCHING VIDEO GAME

[75] Inventors: Steven M. Meyer, Chicago; Wayne A. Kuna, Oak Park; Robert S. Morrison, Vernon Hills; Howard J. Morrison, Deerfield; Richard A. Ditton; Elaine A. Ditton, both of Arlington Heights, all of Ill.

[73] Assignee: Marvin Glass & Associates, Chicago, Ill.

[21] Appl. No.: 452,390

[22] Filed: Dec. 22, 1982

[51] Int. Cl.³ .............................................. A63F 9/22
[52] U.S. Cl. ........................... 273/313; 273/1 GC; 273/DIG. 28
[58] Field of Search ................ 273/85 G, 1 E, 1 GC, 273/DIG. 28, 313; 340/720, 724-727

[56] References Cited

PUBLICATIONS

Kubey, *The Winners' Book of Video Games*, "Deluxe Space Invaders", pp. 75 & 79, Apr. 1982.

Primary Examiner—Richard C. Pinkham
Assistant Examiner—MaryAnn S. Lestova
Attorney, Agent, or Firm—John S. Pacocha

[57] ABSTRACT

A game includes the player's successive selection of matching images within a short time interval initiated by the first selection. Failure to select the proper matching image within the interval results in a mixing of the images. In an electronic video game version of the target shooting type a plurality of sets of matching targets are initially displayed. Each target has mating components. If the targets hit within the time interval do not match, components of each of the hit targets are exchanged to form a mixed target. The successively hit matched targets are removed but are replaced by another form of targets after the first rack. All of the prior form targets must be removed before the succeeding form can be removed from the screen. In still later racks, the initially displayed targets include ones with mixed components to increase the challenge. The player controls the movement of a shooter among the targets and directs the firing of projectiles at the targets. Collision of the shooter with a target ends the player's turn. A sequence of progressively closer views of a background scene that is partially shown in the distance of the present rack are included to enhance the enjoyment of the game.

29 Claims, 15 Drawing Figures

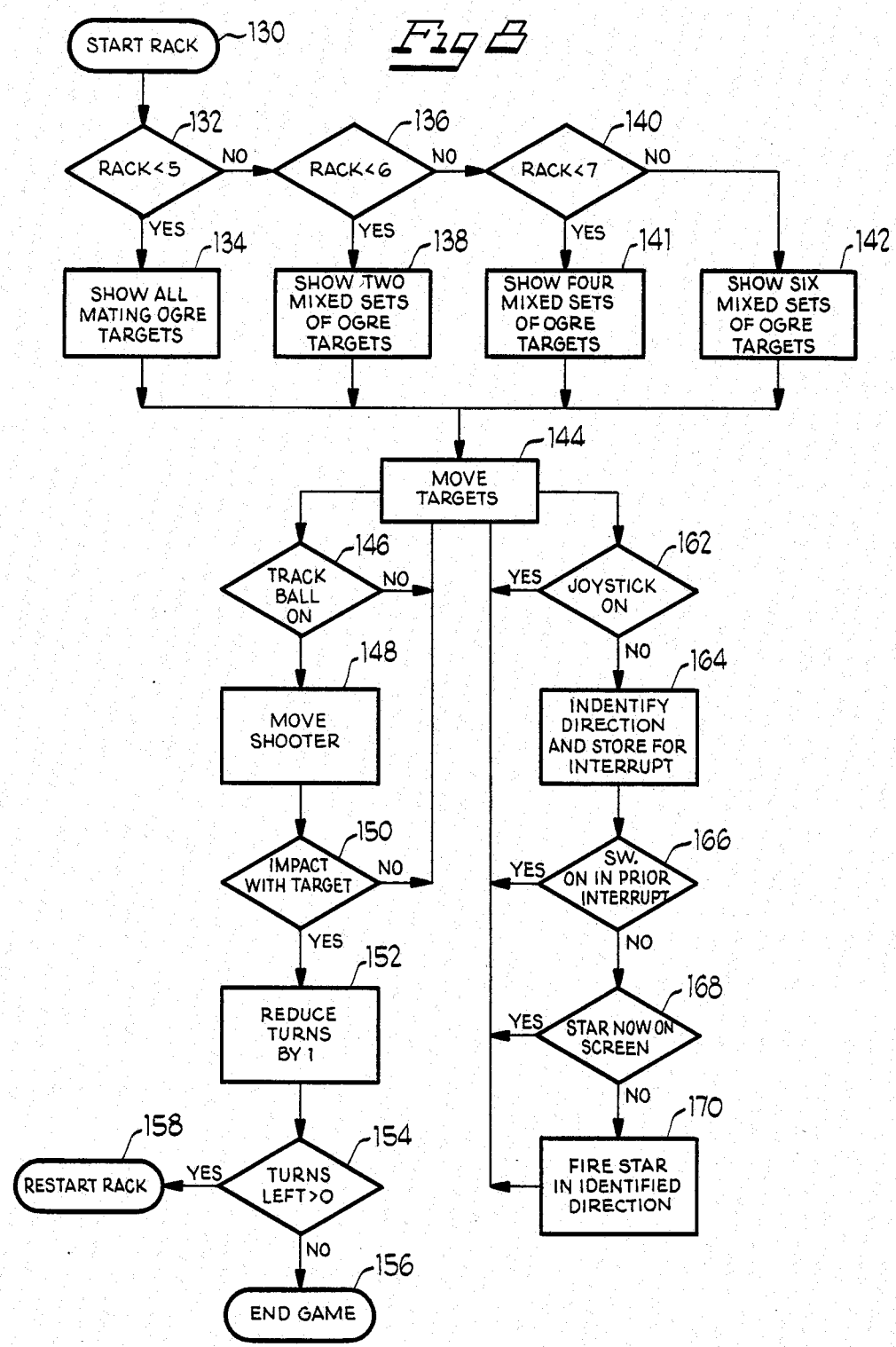

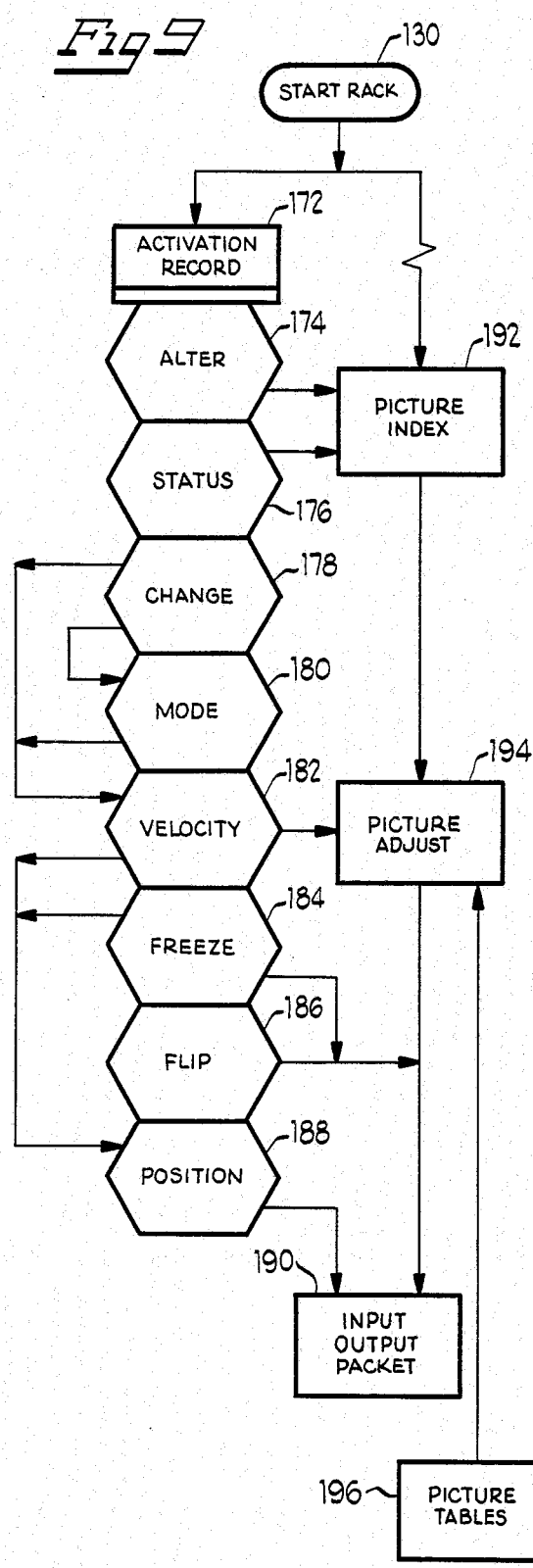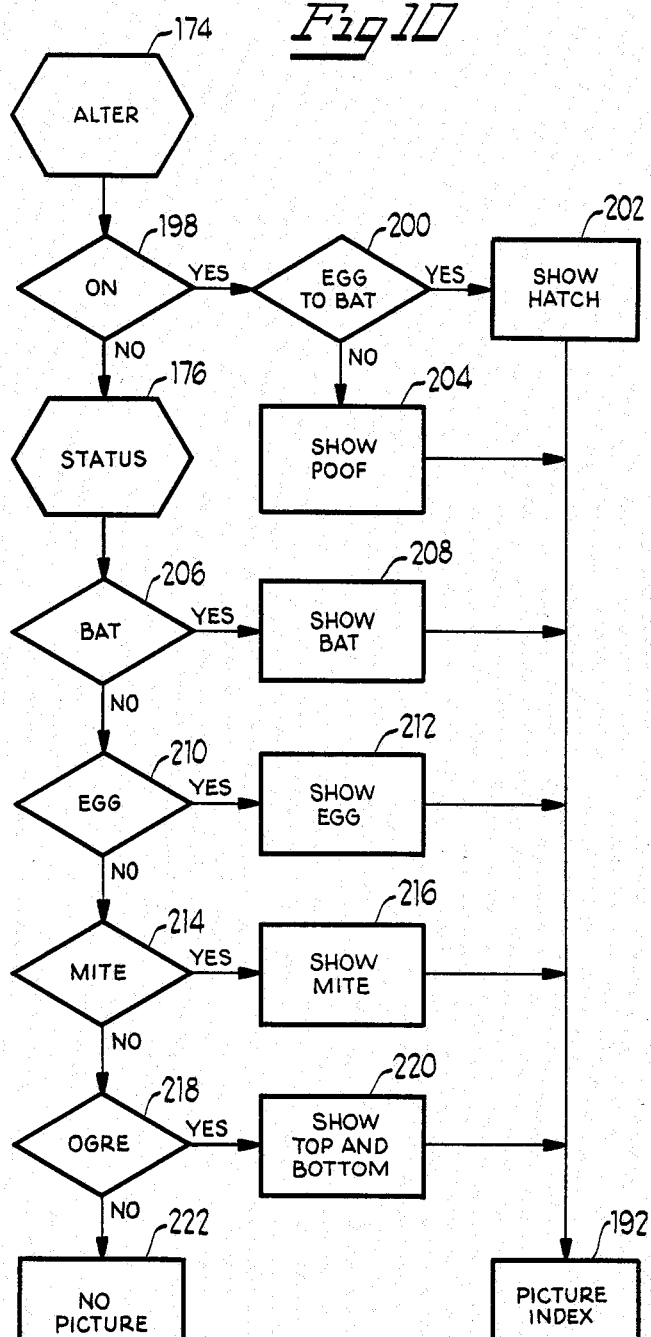

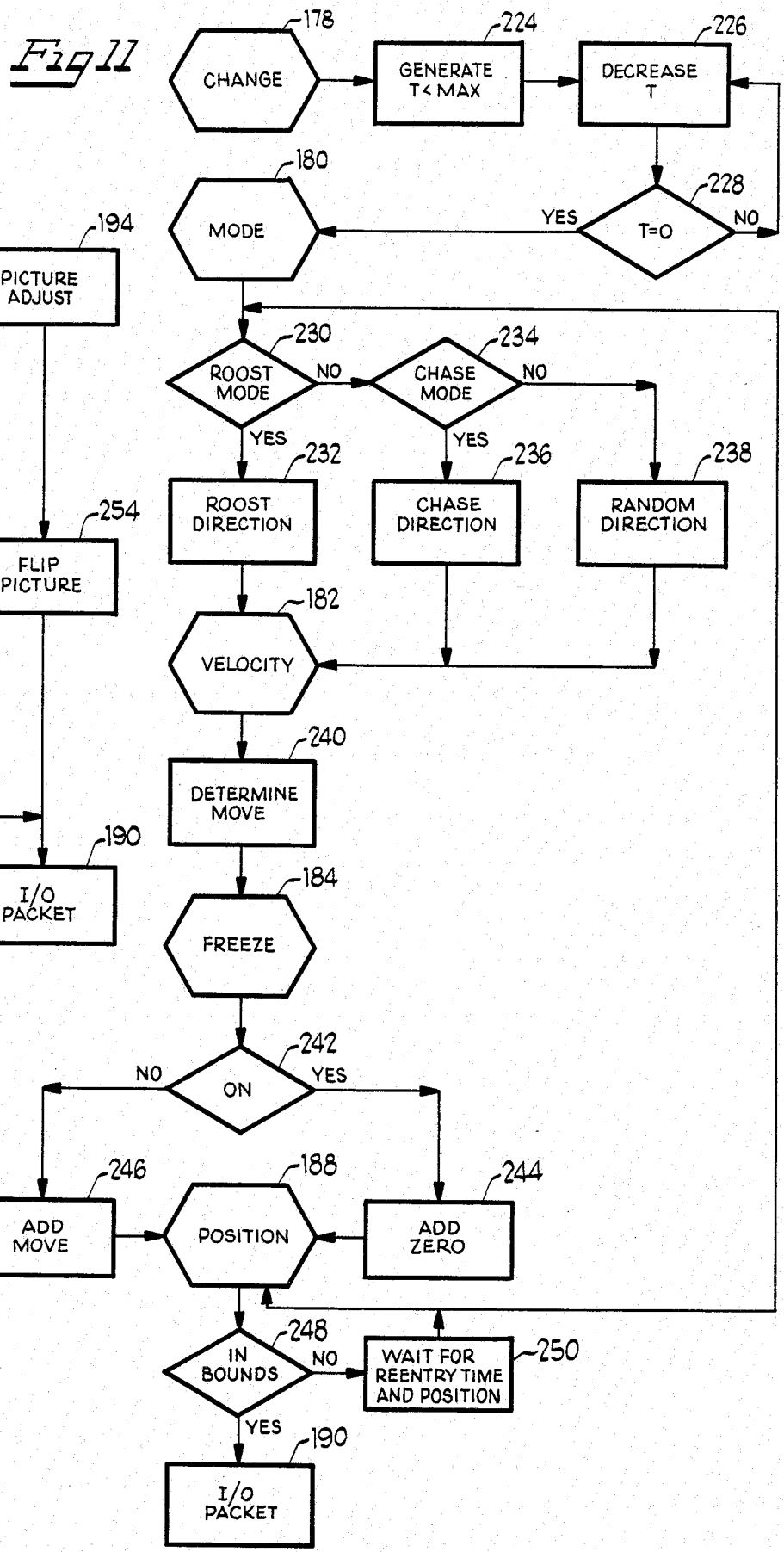

IMAGE MATCHING VIDEO GAME

BACKGROUND OF THE INVENTION

1. Field of the Invention

This invention relates generally to games and, more particularly, to electronic games of the target shooting type of video arcade game.

2. Background Art

Games, particularly electronic video games of the type playable in arcades or through adapters on home television sets, have become very popular. Current games are of various types, including maze chase, sports simulation, electronic variations of games that have become classic entertainment pursuits in other media such as poker, blackjack and chess, as well as target shooting games based on a number of different themes. As a general group, the target shooting games provide challenge to the skill and dexterity and particularly the hand-to-eye coordination and reaction of the player. However, there remains a need for games that challenge other abilities of the player while presenting a penalty for making a wrong decision that is less than immediately fatal to the player's turn. In addition, most of these games either repeat the same background as play progresses or else shift between thematically related scenes in a manner that lacks continuity.

SUMMARY OF THE INVENTION

The present invention is concerned with providing a game in which the player must successively match target images of a particular set during a predetermined time interval in order to score points and advance in the game. Failure to properly match the images results in a mixing of the target images. These and other objects and advantages of the invention are achieved in a video arcade game embodiment in which moving targets are displayed in matching sets. The player through operation of a track ball control has a shooter image to move about the video display screen among the targets and a joystick control to selectively fire star projectiles. Images of the targets are formed of two mating components. When the player selects a first image by hitting it with a star projectile, that selection is retained for a predetermined time interval in a perceptible manner including a frozen or immobilized image of the selected target accompanied by a suitable audio signal. Thereafter, should the player select the proper matching target and hit it with another star projectile, both of the matching targets will be removed. However, should the player fail and instead hit a target that does not match while the first hit target remains frozen, a component of each of the two target images will be exchanged, resulting in a set of mixed images which the player must then either restore or match with a like mixed image. If the player allows the shooter image to encounter one of the targets during the course of the game, the player will lose a turn.

In order to provide further variations of play and succeding challenges as the player's skill increases from play of the game, the removed targets are replaced by targets in another form as the game progresses. To further increase the challenge and difficulty of the game in later racks or rounds, the targets are initially introduced with mixed images. In addition, backgrounds are provided for the video game embodiment in the form of sequentially closer perspective views of the same scene that depict a reentry into the first view following exit from the last view in the sequence to maintain a sense of continuity and enhance the enjoyment of the game.

BRIEF DESCRIPTION OF THE DRAWINGS

For a better understanding of the present invention reference may be had to the accompanying drawings in which:

FIG. 8 is a flow chart of part of the operation of the embodiment;

FIG. 9 is a flow chart showing another part of the operation;

FIG. 10 is a flow chart showing in further detail a portion of the operation shown in FIG. 9;

FIG. 11 is a flow chart showing in further detail another portion of the operation shown in FIG. 9;

FIG. 12 is a flow chart showing in further detail yet another portion of the operation shown in FIG. 9;

DETAILED DESCRIPTION OF THE PREFERRED EMBODIMENT

Figure 1:
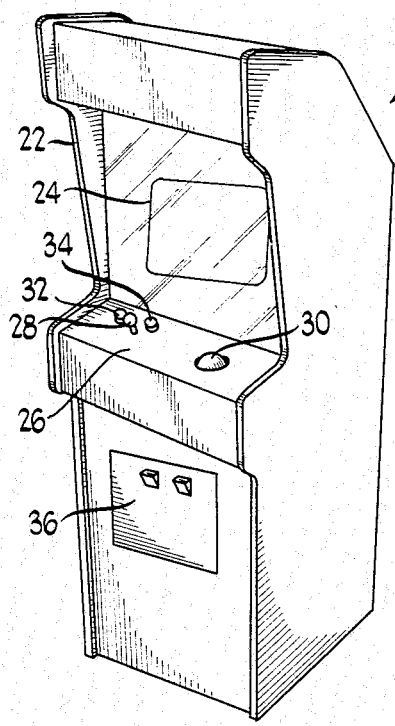
FIG. 1 is a perspective view of the external appearance of one embodiment of the present invention.

Referring now to the drawings in which like parts are designated by like reference characters throughout the several views, there is shown in FIG. 1 a video arcade game 20 embodying the present invention. The arcade game is housed in a generally upright cabinet 22 in which are contained the necessary electronic components including a central processing unit, memory, video display, and sound processing equipment for the game. The video display of the game is shown on a screen 24 in the upper portion of the cabinet 22. Below and in front on the display screen 24 there is a control panel 26 which includes a joystick 28 for player control of projectile firing and a track ball 30 for player control of the movement of a shooter image on the display screen. Also mounted on the control panel are buttons 32 and 34 for selecting "one" or "two" participant play of the game. Initial activation of the video arcade game 20 is controlled by the deposit of a coin through the slots in the coin box mechanism 36 mounted in the lower front portion of the cabinet 22.

Through the joystick control 28 and the track ball control 30 on the control panel 26, a player is able to interact with the electronic game of the present invention to play and enjoy multi-rack or multi-round play embodying the game. As shown in FIGS. 2 through 5, the game may have four sequential racks although it is of course possible to play and enjoy the game with a lesser number of different racks or even as a single round game. The embodiment shown and described here is presented in a target shooting type video game format with the targets moving about the playing field background on the display screen 24 with each target in one of a number of prepatterned paths or directions available to it. In order to provide a sense of continuity, each of the four backgrounds 40, 42, 44 and 46 shown in FIGS. 2, 3, 4 and 5 respectively are progressively closer perspective views of the same scene and show portions of the same elements as in the preceding view but in a larger size. Background 40 depicts a mountain range 48 in the approximate center of which is a cave opening 50 flanked by mountains 52 and 54. The middleportion of scene 40 includes rocks 56 and 58.

Figure 4:
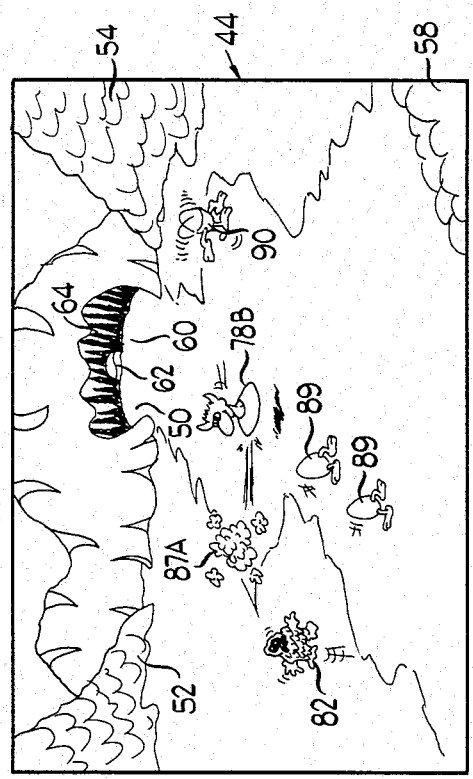
FIG. 4 is an illustration of a display occurring during the third rack of play in accordance with the embodiment.
Figure 2:
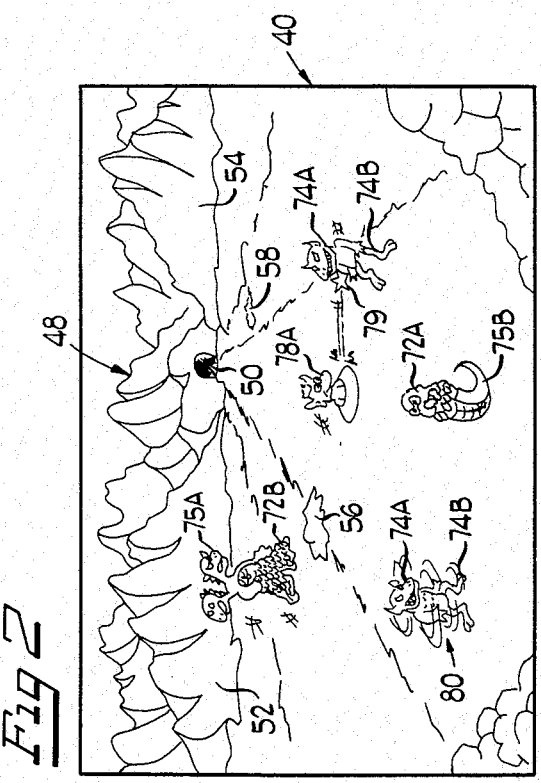
FIG. 2 is an illustration of a display occurring during the first rack of play in accordance with the embodiment.
Figure 3:
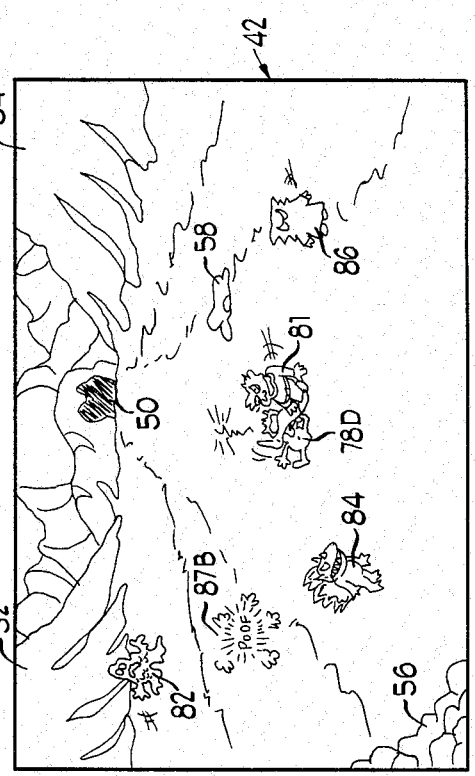
FIG. 3 is an illustration of a display occurring during the second rack of play in accordance with the embodiment.

The background 42 of the second rack shown in FIG. 3 is a closer view of the scene shown in FIG. 2 for the first rack. Cave opening 50 is much larger and closer, while only portions of the mountains 52 and 54 are now visible. Similarly, an enlarged portion of rock 56 now occupies the lower left-hand corner of view 42, and the rock 58 is much closer and hence larger. Background scene 44 as shown in FIG. 4 for rack three is in the immediate proximity of the cave mouth 50 and provides a view into a portion of the cave 60 including an exit opening 62 at the other end of the cave. Rock 56 is no longer visible and a large fragment of rock 58 is now in the lower right-hand corner with only large ends of the bottoms of the mountains 52 and 54 being visible in the immediate proximity of the cave mouth 50. A limited view of the interior of the cave 60 shows stalagtites 64.

Figure 5:
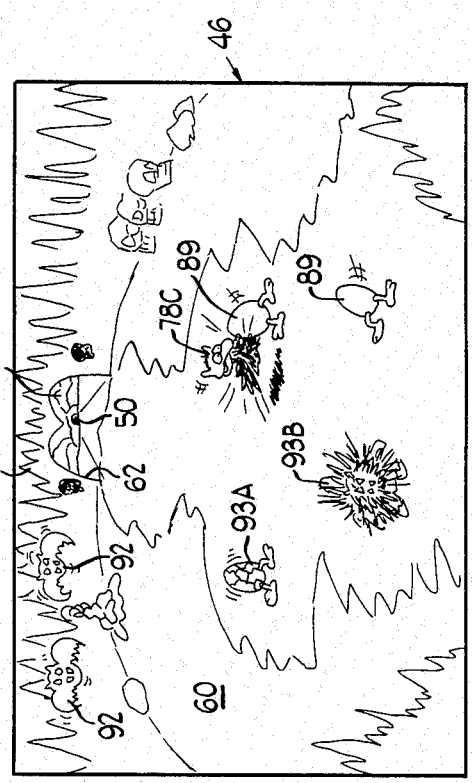
FIG. 5 is an illustration of a display occurring during the fourth rack of play in accordance with the embodiment.

FIG. 5 shows the closest view 46 of the background as displayed in rack four; namely, the interior of the cave 60 with its stalagtites 64. Visible through the cave exit 62 is another cave entrance 50 in a distant mountain range 48. As the game proceeds beyond the fourth rack and background 46, the background 40 is again repeated and the other racks again followed in sequence by backgrounds 42, 44 and 46, presenting a continuous but yet ever-changing related background to further enhance the play and enjoyment of the game.

Figure 6:
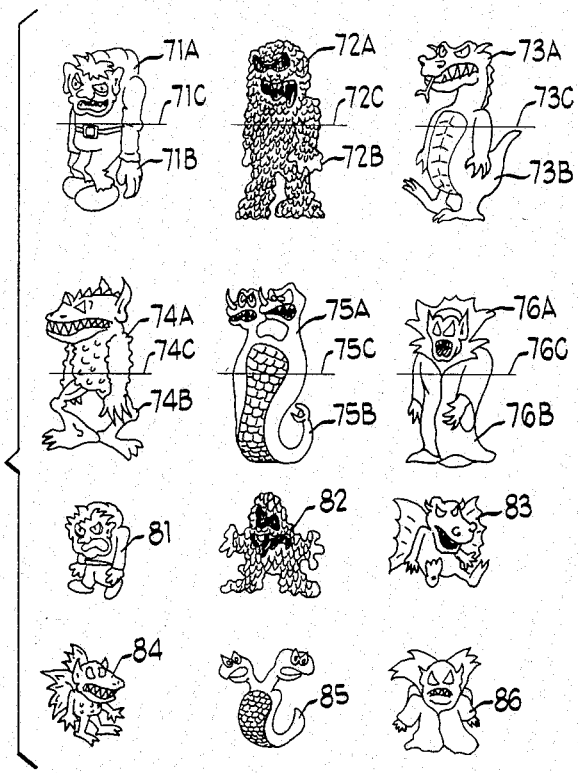
FIG. 6 is an illustration of target images used in the embodiment.

The player begins each of the racks illustrated in FIGS. 2 through 5 having to match and remove target images. Six different target images, conveniently in the form of ogres, are initially displayed in matching sets of two. Examples of suitable ogre target images 71 through 76 are shown in FIG. 6. Each of the initial target images is formed of mating top and bottom components. For example, the first ogre shown in FIG. 6 has a top component 71A and a bottom component 71B. The target images 71 through 76 are so constructed that each of the top components is compatible, in terms of width and where lines intersect the component meeting line like 71C, with the bottom component of each of the other target images. In the video arcade game 20 each of the ogre targets is movable in a forward and reverse direction on four different paths. The particular direction and path of movement at any one point in time is randomly selected.

A controllable shooter image 78 is positionable anywhere within preset peripheral boundaries on the screen by the player moving the track ball control 30. The peripheral boundaries generally correspond to the boundaries of the background designs 40, 42, 44 and 46 except the upper horizontal boundary is set somewhat below that of the background design in order to provide for the display of information such as current player's turns remaining and score (not shown) as well as the game high score (not shown). The movement of the player controllable shooter image 78 is effected through the track ball control 30, and the shooter image 78 can effectively be moved at different speeds and in any direction selected by the player. In this embodiment an encounter between the shooter image 78 and any of the target images will result in the loss of a player turn or "life". Accordingly, the player is provided with projectiles in the form of a star 79 which emanates from the shooter image 78 in response to the player's operation of the joystick control 28 to fire a star in any one of the up, down, right, or left directions.

At the start of the first rack all of the large ogre targets are introduced in matching pairs. When the player initially selects one of the target images by moving the shooter image 78 into position through use of the track ball control 30 and firing a star 79 by operation of the joystick control 28, the selected target image is retained immobilized or "frozen" for a predetermined time interval. The fact that the target has been hit and immobilized is signaled in this embodiment both with a consequential image such as image 80 in FIG. 2 and by a suitable audio signal. All of the target characters are actually represented by at least a pair of images shown in alternating fashion to animate the targets. The consequential frozen image 80 is created by alternating the animation images for the "frozen" target each time the video display is scanned at interrupts of approximately one-thirtieth of a second. In addition, additional images for a particular target character are used for movement in different directions. If the player is successful in selecting, by shooting another star 79, the matching ogre target, the pair of ogres 74 will disappear. However, if the player hits an ogre target that does not match the first selected and now frozen ogre, an image of a mutant ogre in which the top components of the two hit ogres have been exchanged will result. Examples of such mutants are shown in FIG. 2 as images 75A-72B and 72A-75B. Thus, the player must successfully avoid encountering any target image so as not to lose a turn or "life", while having to match the target images and suffering the penalty of having to deal with mutant images should he fail.

In order to return the mutant images back to the initial "normal" ogre images, the player has to first hit and freeze one of the mutants, as for example 75A-72B. During the predetermined time interval that image is frozen, the corresponding mutant image 72A-75B has to be hit to again exchange the top components to produce images 72A-72B and 75A-75B. It would also be possible in this embodiment to match the mutant images and cause them to disappear. Accordingly, if the player were to first select the mutant image 72A-75B and while it is frozen, select a corresponding image 72A-75B that is on the display screen, both would be removed. The time interval during which the first selected target is frozen will terminate as soon as a second image is hit, whether that second image does or does not match the first selected target. Again hitting the frozen target image will both end the time interval and again freeze the target for another predetermined time interval. Rack one is completed upon effecting removal of all of the pairs of ogre targets.

Removal of the ogre targets in the second rack and beyond results in replacement by the corresponding smaller mite targets. FIG. 6 illustrates each of the mite targets 81 through 86 corresponding to the respective ogre targets 71 through 76. Intermediate the disappearance and change of status of a target such as from the first ogre form of target to the second mite form, there is a transitional "poof" image 87 which for animation purposes is actually two images, such as 87A shown in FIG. 4 followed immediately by 87B shown in FIG. 3. The mite targets 81, 82, 84 and 86 in FIG. 3 are shown moving toward the shooter image 78D and the mite target 81 has encountered the shooter image, ending a player turn. Once such an encounter is discerned, ensuing variations of the shooter image representative of a collision such as image 78C shown in FIG. 5 and the knocked down shooter image 78D depicted in FIG. 3 signal the end of the turn. Different images are also used for the shooter image 78 to show it moving in different directions in a similar manner to that done for the target images. In FIG. 4 the shooter image 78B is moving toward, and is shown looking toward, the left edge of the display screen.

Hitting a mite target while large ogre targets are still on the screen will result in freezing or immobilizing the mite target as occurred with the first hit ogre target. Although play of the game could require matching of the mite targets to effect their removal, it has not been included in this embodiment. Rather, once all of the large ogre targets have been eliminated, hitting any remaining mite targets with a star projectile 79 will result in its disappearance. Once the player has removed all of the ogre targets and they have been replaced by the mite targets, the movement of the mite targets will change from a randomly selected one of the eight available prepatterned directions to a chase or follow mode in which each of the mite targets moves in the shortest horizontal or vertical path between its present position and that of the shooter image 78. Accordingly, the player is presented with yet another challenge to successfully advancing through the multi-rack game in that upon successfully eliminating all of the large ogre targets, he will find them replaced by smaller mite targets which will then converge upon him.

In order to add additional variation and entertainment to the game, a third form of targets is introduced in the third rack as illustrated in FIG. 4. Here the player, after successfully completing the first and second racks, has also succeeded in eliminating all of the ogre targets and is in the process of eliminating the mite targets as illustrated by the poof image 87A. However, in the third rack and all following racks, the player now finds that upon shooting a mite target with the star projectile 79, the mite target is, shortly after the transitory poof image 87A-87B, replaced with an egg target 89. Hitting an egg target 89 while mite targets such as 82 shown in FIG. 4 are still being displayed will result in freezing the egg target as depicted by the consequential image 90 in FIG. 4. Again, the freezing of a target is accompanied by a suitable audio sound signal. In the same manner as the mite targets began to converge upon the shooter image 78 once all of the large ogre targets had been eliminated, the egg targets 89 will converge upon the shooter image 78B in rack three upon elimination of the last remaining mite target 82. Once all of the mites have been eliminated, shooting the eggs 89 will result in disappearance without replacement for successful completion of the rack in all but the racks that are multiples of four.

Once the player has eliminated an egg in the fourth rack and every succeeding fourth rack, the egg 89 will be replaced by yet another target in the form of a bat 92. Instead of a poof image 87A and 87B, removal of an egg target 89 results in the transitory hatching images 93A and 93B depicting the bat target 92 hatching out of an egg target 89. To provide further variation of play, as the bat targets 92 hatch, they are moved to a preassigned "roosting" position among the stalagtites 64 in the roof of the cave 60 in the background scene 46. When all of the prior status egg targets have been eliminated, the bat targets 92 will descend from their roosts and converge upon the player controlled shooter image 78. The player must, through operation of the track ball 30 and the joystick control 28, evade encounters or collisions with the bat targets while shooting them with star projectiles to remove them in order to score points and advance to the next rack.

Without introducing completely new target images, variations and challenging play are presented in the fifth rack by initially introducing some of the ogre targets with mixed instead of correctly mating components. Accordingly, a mixed component ogre target image such as 72A-75B shown in FIG. 2 may be initially introduced. The player will have to either return the mixed ogre target to its proper mating component appearance or pair it with a similarly mixed component image in order to effect its removal as was done with the mixed component images resulting from the player's own improper or inaccurate selection of target images. Play in the remainder of rack five will proceed as in rack three with the rack being completed upon successful elimination of the egg targets 89. The difficulty of succeeding racks will be increased by introducing more of the mixed component targets until all of the ogre targets are introduced with mixed components.

In order to continue the escalation of challenge and difficulty of playing succeeding racks, the movement of the target images can be increased and other timing variables adjusted to challenge even the most skilled and adept player. Initially a player may be provided with three turns or "lives" and be awarded additional turns for attaining a scoring goal of 10,000 points. Thereafter additional lives are given for each additional plateau of 15,000 points. The player scores points by removing the targets as follows:

300 points per matched pair of mating ogres:
500 points per matched pair of mixed ogres;
150 points per mite;
500 points per egg; and
750 points per bat.

However, points may also be awarded for other accomplishments such as exchanging the tops of mixed ogre targets to restore them to their initial "normal" component mating appearance.

Figure 7:
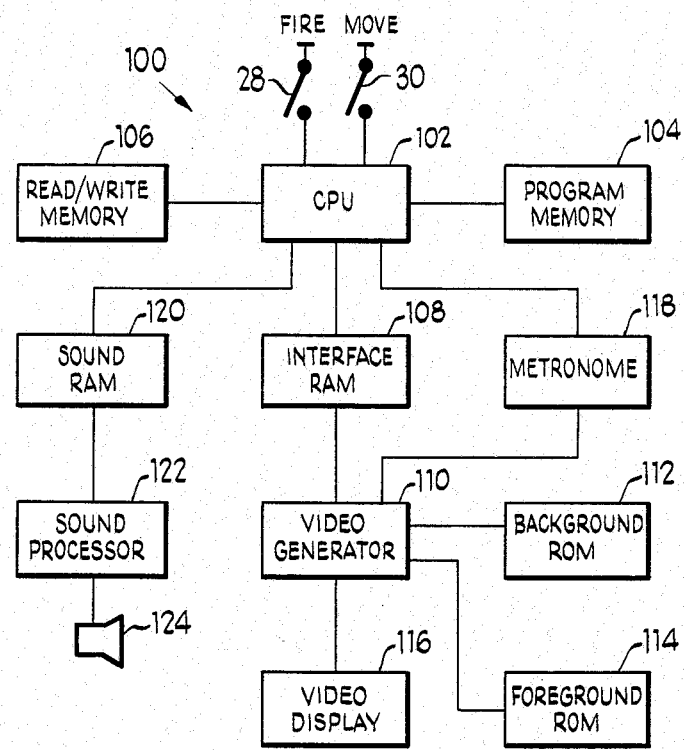
FIG. 7 is a block diagram illustrating the electronic components of the embodiment.

FIG. 7 shows an exemplary electronic apparatus 100 for implementing the present invention that includes a microprocessor unit 102 connected to the player operated controls. The "left", "right", "up", and "down" switches of the joystick 28 and the sixteen directional movement switches of the track ball 30 are each represented in the block diagram by a single switch. In addition, the CPU 102 is connected to a non-volatile program memory 104, a read/write memory 106, an interface RAM 108, and a sound RAM 120. The basic game and image programs are stored in memory 104. The read/write memory 106 stores current information for a particular game apparatus 20 such as high score, number of coins deposited and the like. In addition, memory 106 stores current game information that is erased at the start of every game such as game score, plus information that is current for each rack or round such as the time delay before an out of bounds target image reappears.

The interface RAM 108 includes the input/output binary information for implementing, in different positions, the target images 71 through 76, 81 through 86, 87, 89, 92 and 93, as well as the shooter image 78 and projectile image 79. The RAM 108 is connected to a video generator 110 which also receives input from a background picture ROM 112 and a foreground picture ROM 114. Included in the generator 110 is a field comparator that properly integrates the background and foreground scenes. The video generator 110 drives a conventional video display 116. A metronome 118 also driven by the video generator 110 is connected to the CPU 102 so that the CPU is synchronized with the video generator 110.

A sound RAM 120 is connected to the CPU 102 and to a sound processor 122 for driving the speaker 114 to produce audio effects that further the play of the game. While a variety of well known devices can be used as the apparatus 100, one adaptable apparatus is that used in the video arcade game TRON and described in the Midway Mfg. Co. Operator's Manual for that game.

Referring now to the flow chart of FIG. 8, after deposit of the proper coinage in the slots provided in the coin box mechanism 36 and selection of the correspondingly proper one or two player participation by depression of the applicable button 32 or 34, the game begins with the start of a rack as represented by 130. In the start of racks one through four the game is initially started with all of the ogre targets having mating components. Accordingly, if the rack is less than five, as determined at 132, the video display 116 will be initialized by procedure 134 with all of the large targets having their components mating. However, if the rack number is five, as determined at 136, then the display is initialized showing two sets of ogre targets with their components mixed by the 138 procedure. Similarly, if the sixth rack is being started as being determined at 140, then four mixed sets of ogre targets are initially shown as indicated at 141. For the seventh rack and beyond all six sets of ogre targets are initially mixed by the 142 procedure. The electronic apparatus 100 then begins to move the targets about the screen as generally indicated at 144 and also monitors the track ball 30 which dictates the speed and direction of movement of the shooter image.

In accordance with the player input through the track ball, shooter image 78 is moved by the routine 148 within the established boundaries on the video display screen 24. Should the player's operation of the track ball control 30 cause the shooter image 78 to hit a boundary, the shooter image 78 will be restored to a position immediately prior to impacting the boundary and further movement will be limited to a direction away from or parallel to the boundary line. Movement of the shooter image 78 is monitored by 150 to discern any encounter with a target image. In the absence of any impact or encounter, the monitoring of the track ball control and movement of the shooter at 146 and 148 respectively continues. However, should the shooter image 78 encounter any of the targets, it will result in the loss of a player turn or life with the ensuing images 78C and 78D shown in FIGS. 5 and 3 respectively. As indicated at 152, the player's remaining turns will be reduced by one following an encounter with a target. A determination is then made at 154 whether the player has any turns remaining and if not, the game is ended as indicated at 156. Should the player have any turns remaining, the rack will be restarted as indicated at 158 with the same targets that were displayed just prior to the collision. For example, if the player has succeeded in eliminating two pairs of ogre targets but has mismatched or mixed the components of two other sets of ogres, the rack will restart with one set of ogre targets having properly matched components and the two mixed-up sets of ogre targets as illustrated in FIG. 2. The two sets previously eliminated will not reappear.

While monitoring the operation of the track ball control 30 and moving the shooter image in response to that control, the player operation of the joystick control 28 to regulate firing of the star projectile 79 is also monitored at 162. The operation of this embodiment is such as to limit the player's firing to one star projectile at a time. Accordingly, after identifying and storing the direction indicated by the joystick switch at 164, checks are made at 166 and 168 to insure that the firing of more than one star does not occur during each cycle or interrupt of about one-thirtieth of a second. If the joystick is on and no prior fired stars remain, a star projectile will be fired in the proper "right", "left", "up" or "down" direction as indicated at 170, and the movement of the star will continue in that direction until it goes off screen or hits a target. The movement of the targets indicated generally at 144 in FIG. 8 as well as the display of the proper target image throughout the play of the game is shown in greater detail in flow charts of FIGS. 9 through 15.

An activation record 172 that is part of the interface RAM 108 is involved in the movement and display of each of the twelve target images and includes alter 174, status 176, maximum change time 178, mode 180, velocity 182 which incorporates both direction and speed, freeze 184, flip 186, and position 188 information. The position 188 as influenced by velocity 182 and freeze 184 is stored in the input/output packet 190 that is part of the interface RAM 108. Also stored in the input/output packet 190 is information on the target picture from picture index 192 and picture adjust routine 194 which has input from picture tables 196 that is part of the program memory 104. The picture index 192 is influenced by both alter 174 and status 176 information as well as procedures 132 through 142 in FIG. 8 which affect the index 192 at the start of the rack. Picture adjust 194 which is affected by the index 192 and velocity 182 plus an image component exchange procedure that is initiated when it is resolved that the player did not properly select the matching large ogre image selects the proper picture from tables 196.

FIG. 10 shows in greater detail how alter 174 and status 176 affect the picture index 192. The transitory poof image occur immediately following the disappearance of one form of target except, as had been previously described with respect to the play of rack four, when an egg is replaced by a bat. A different alter image, namely, that of the egg target hatching as illustrated by images 93A and 93B in FIG. 5, is shown if the egg form target 89 is changing to the bat form target 92. Alter switch 174 is either on or off and is only on for a short interval following disappearance of a target form. If it is determined at 198 that the alter switch is on, it is next determined at 200 whether the egg form is changing to the bat form of target, and if that change is taking place, then the hatch image 93A and 93B is keyed by the procedure 202. A disappearing target that is not being replaced or if the replacement is by any form other than the bat target 92 causes the poof image 87A and 87B to be keyed in the index 192 by the procedure 204. When the alter switch is not on, then the status 176 of the target is checked to determine whether the bat, egg, mite, or ogre form of target is to be shown as indicated at 206 through 220 in FIG. 10. The status of a target that has disappeared and is not replaced by any succeeding form is "gone" and of course no picture is shown as indicated by procedure 222.

How change 178, mode 180, velocity 182, and freeze 184 affect position 188 is shown in greater detail in the flow chart of FIG. 11. When a target, regardless of its form or status, is initially displayed it is randomly positioned at any one of a number of available prepatterned entry positions. The initial entry position is initialized at 188 of the activation record 172. As play progresses, the position information at 188 is modified. Change 178 is the maximum time interval during which a target will continue moving in one direction. In procedure 224 a random change time less than the maximum time of 178 is generated. Random time "T" is then decreased as a function of actual time in procedure 226 and a determination made at 228 whenever the random time has reached zero. The activation record is scanned or reviewed at the interrupts of approximately one-thirtieth of a second. If the change time has not decreased to zero, then the target continues to move in the selected direction. However, once the change time reaches zero, a check is then made of mode 180 to determine if the direction of the target is to change to a roost direction, a chase direction, or another one of the prepatterned directions to be randomly chosen as indicated by 230, 232, 234, 236, and 238 in FIG. 11. The direction thus determined is keyed to velocity 182 and the direction and amount of movement since the last interrupt is then determined at 240.

A check is made at 242 to determine if freeze 184 is on. If the target is frozen or immobilized, then zero movement is added to the position as indicated at 244. However, if freeze 184 is not on, then the movement determined in 240 is added to position 188 as indicated by 246. Updated position 188 is then reviewed to determine if the target remains in bounds at 248 and if it is in bounds, the information is keyed into the input/output packet 190. If the added movement of the target has caused it to go out of bounds, there will be an out of bounds time delay before the target reenters the playing field at a randomly selected position as indicated at 250, and upon reentry the position will be inserted in 188 and a new direction for movement selected depending on the mode of the target.

Before the picture from tables 196 as indexed by 192 and adjusted by 194 is keyed into the input/output packet 190, a check is made at 252 to determine whether freeze 184 is on. If freeze 184 is on, then the picture is flipped by procedure 254 to the corresponding similar image of the target in the same status for the purpose of effecting animation of the character. While the freeze is on, the target picture is flipped between the two images at every interrupt to produce the consequential frozen image such as illustrated at 80 in FIG. 2. When freeze 184 is not on, a check is made at 256 of flip 186 which is set to change at longer time intervals than every interrupt as occurs when the freeze 184 is on. Should flip 186 be on, the picture will flip through the procedure at 154, and if neither the freeze nor flip are on, then the picture from picture adjust 194 is keyed into the input/output packet 190.

Figure 13:
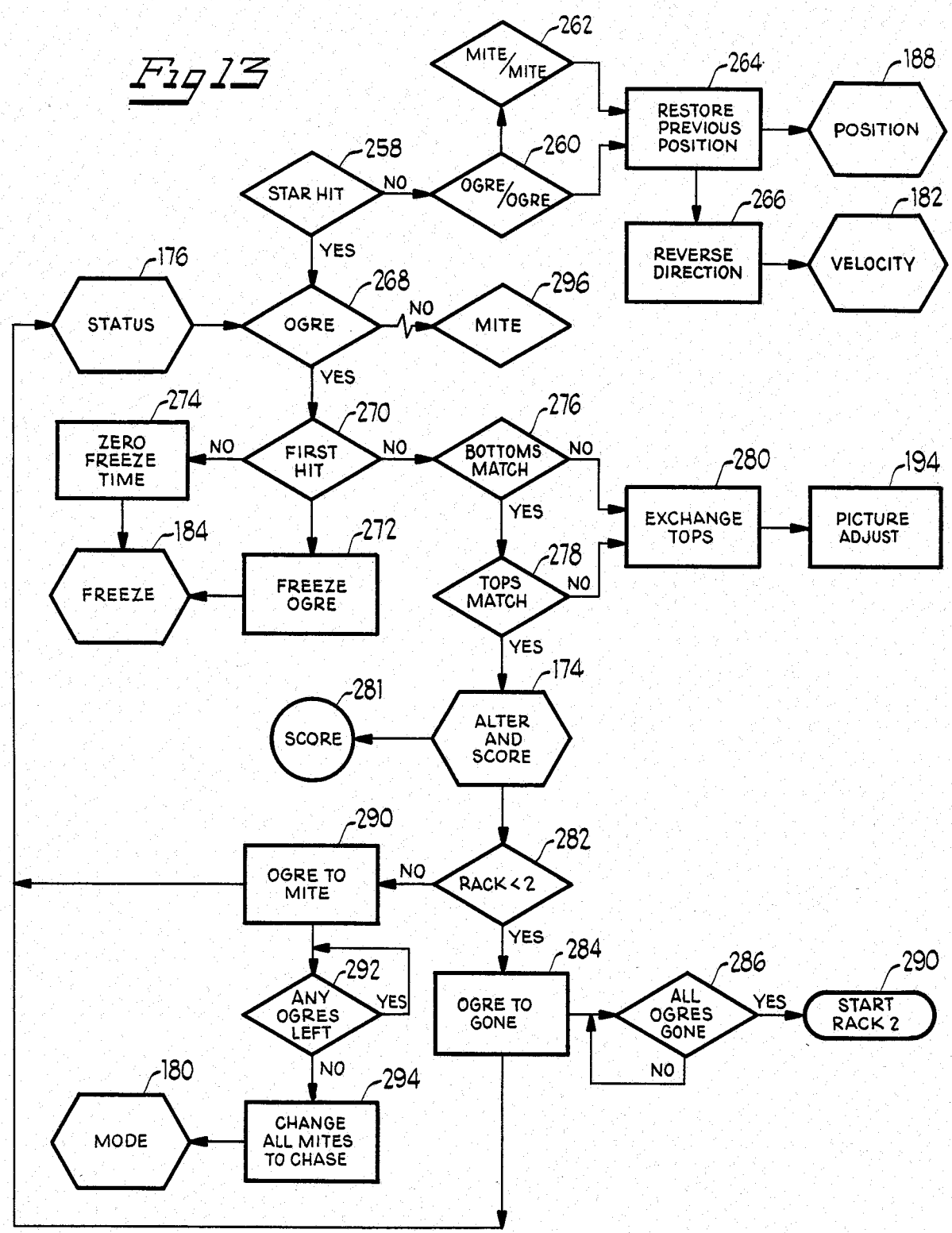
FIG. 13 is a flow chart of still another part of the operation of the embodiment.
Figure 14:
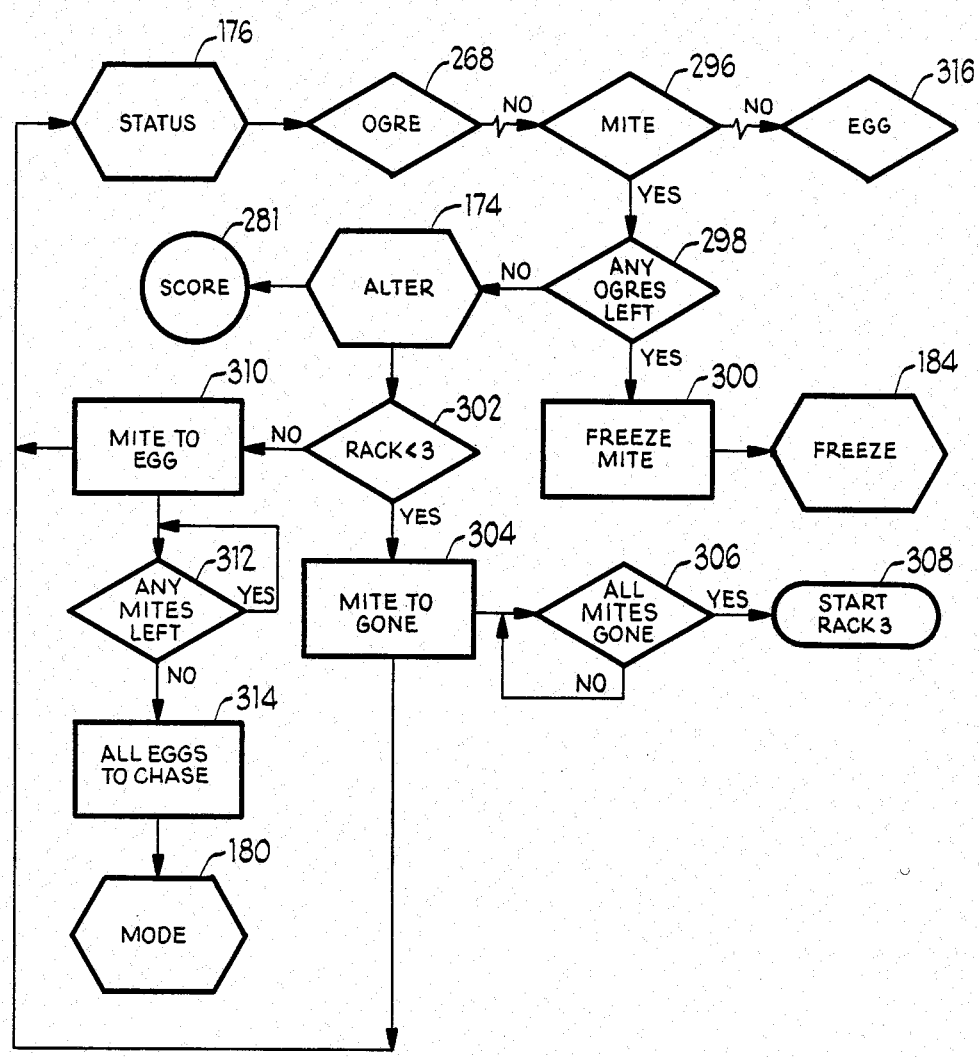
FIG. 14 is a continuation of the flow chart shown in FIG. 13.
Figure 15:
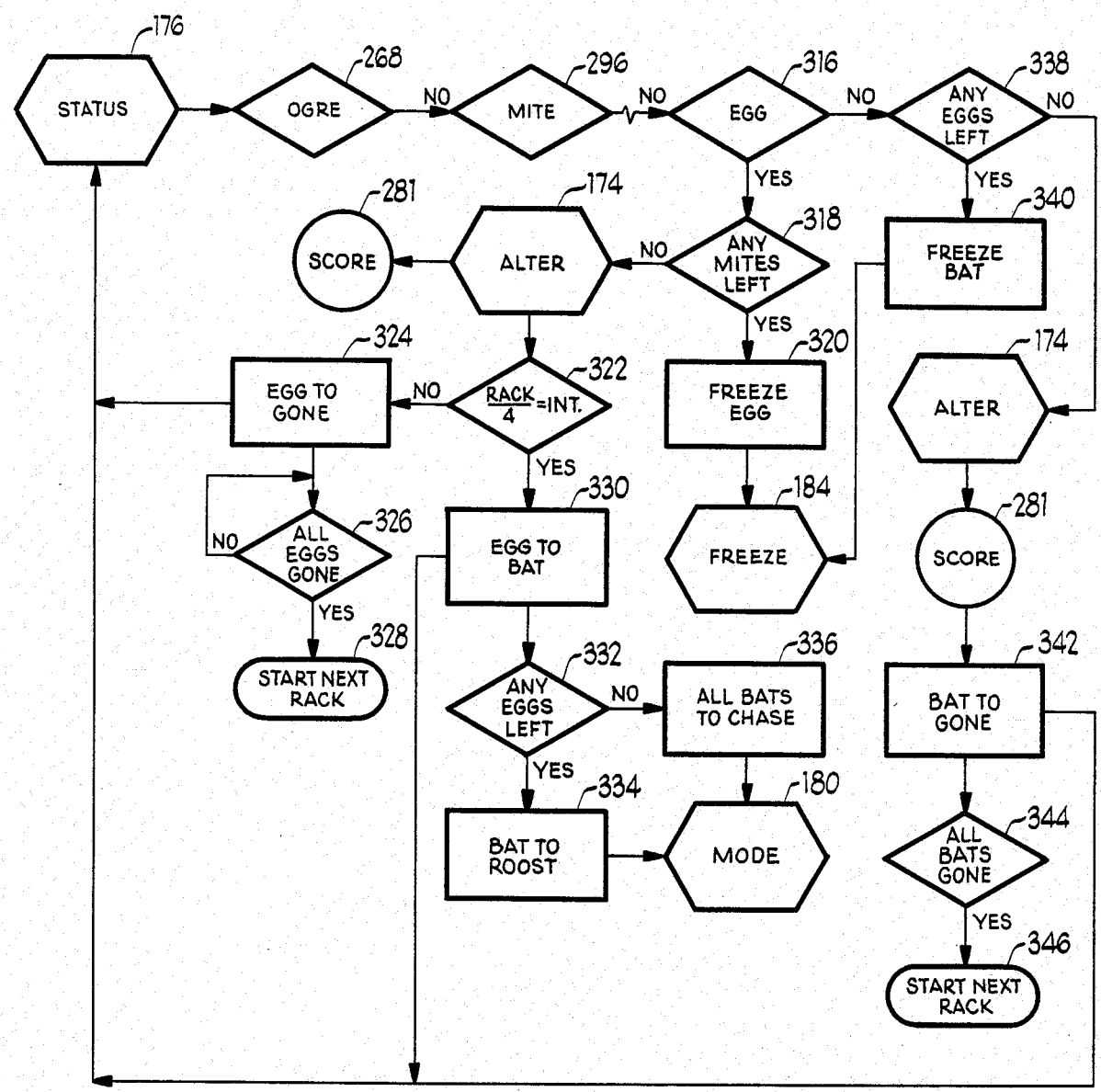
FIG. 15 is another continuation of the flow chart shown in FIGS. 13 and 14.

In this embodiment it is unlikely that the player will fire a star projectile from the shooter image 78 and then move the shooter image 78 into collision with the star 79. Accordingly, such an unlikely occurrence has not been given any effect in the play of the game. However, collisions of certain of the targets with each other, namely, collisions between ogre targets and collisions between mite targets, do occur and are noticably perceived. In addition, hitting any of the target images with a star projectile directly influences the play of the game. The resolutions of such collisions are illustrated in FIGS. 13 through 15.

Initially a determination is made for each target through a check of its position whether it has collided with a star as at 158. If not, a further check is made at 260 to determine if an orge target has collided with another ogre target and if not, a still further check is made at 262 to determine whether a mite target has collided with another mite. In the absence of any collision between ogres or between mites or a star hit, the movement of the particular target proceeds as previously discussed in connection with the flow charts in FIGS. 9 through 12. However, if there has been a collision between ogre targets or between mite targets, then the position of each colliding target immediately prior to the collision is restored by routine 264 and the direction of both of the targets is reversed by routine 266.

A determination at 258 that a target was hit by a star results in a check of the status of the target at 268. If the target is not an ogre, a further check of its status is made. Once it is determined that the target is an ogre, then a check is made at 270 to detect if it is the first hit ogre and if so, the ogre is frozen by the procedure at 272 which is then keyed to freeze 184 in the activation record 172. If the ogre is distinguished as not the second one hit, that is, if there is already an earlier hit frozen ogre target, then the prior freeze time is zeroed by the procedure at 274. The procedure at 276 then resolves whether the bottom components of the ogre and the prior hit ogre match and a further check is made at 278 to resolve if the tops match. In the absence of a match of both the tops and the bottoms, an exchange tops procedure 280 is activated which through 194 adjusts a resultant ogre target image with mixed top and bottom components. When both the tops and bottoms match, alter 174 is activated which will index the poof image, the player is awarded points at 281, and a check is made at 282 to see if this is the first rack of play.

If it is the first rack, the target status is changed to gone at 284. Thereafter, a check of all of the targets is made at 286 to see if all of the ogres are gone and if so, rack two is started at 290. For the second rack and beyond, the status of the ogre target is changed at 292 to a mite and a further check is then made at 292 to determine if any ogre targets are left. In the absence of any ogre targets, all of the mites are changed at 294 to the chase mode, and that change is communicated to mode 180 in the activation record 172.

When it was determined that the target hit by the star was not in ogre status at 268, a check was then initiated at 296 to see if the target was in mite status. If the target is a mite, a check is made at 198 whether any ogres are left and if so, the mite is frozen at 300. In the absence of any ogre targets, alter 174 is activated, the player scores points at 281, and a check made to see if the game is in the second rack at 302. The status of the mite is changed to gone at 304 in rack two, and a further check is made at 306 to determine if all of the mite targets are gone and if so, rack three is started at 308. In rack three and beyond, the status of the mite is changed to an egg at 310 with a check following at 312 to see if any mites are left, in which case nothing further happens. However, if all of the mites are gone in the third rack and beyond, the mode of the eggs is changed to chase at 314.

Should the target hit by the star not be an ogre or a mite, a check is then made at 316 to see if the target is in the form of an egg with the operations indicated in continuation of the flow chart in FIG. 15 following. If the target status is egg, a check is made at 318 whether any mite status targets are left and if so, the egg is frozen and that information transferred to freeze 184 in the activation record 172 for the target. However, if all of the mites are gone, alter 174 is activated, the player's score is advanced at 281, and a check made at 322 to determine whether it is the fourth rack or a rack that is a multiple of four, such as 8, 12, 16, etc. In the third rack and all further racks that are not multiples of four, the status of the egg target is changed to gone at 324. Upon changing the status of the hit egg target to gone at 324, a check is made at 326 to see if all of the egg targets are gone and if so, the next rack is started at 328.

In the racks that are multiples of four, the egg from of the target is changed to the bat status at 330. A check is then made at 332 to determine whether any of the egg targets 89 remain and if so, the bat is changed to the roost mode at 334 which operation is then keyed into the mode 180 of the activation record 172. If no eggs are left, then the mode of all of the bat targets 92 is changed to chase by procedure 336. A determination at 316 that the target was not egg status would mean that it had to be in the bat status and a further determination would then be made at 338 whether any egg targets were left. If egg targets still remain, the bat would be frozen at 340 but if all eggs were gone, the alter switch 174 would turn on, the player would score points at 281, and the status of the bat target would then be changed to gone at 342. Once the check at 344 indicates that all of the bats are gone, the next rack is started at 346.

For each different form of the targets, three sounds are assigned to the twelve targets. One of the sounds is activated for each one-third of the targets on the display screen. Accordingly, when a rack is started all three ogre sounds will occur but as the player matches and causes two pairs to disappear, one of the ogre sounds will also disappear. Should the game be in the second rack or beyond, there will then be four mites on screen accompanied by one mite sound. Like changes of sounds will continue as each four targets of a particular status are replaced by four of the succeeding form to not only add to the enjoyment of the play of the game but also provide the player with audio cues of his progress.

Play of the game may be made progressively more difficult by increasing the speed of the various target images, decreasing the time in which they remain immobile after being hit and decreasing the maximum time before they change direction. These and other changes and modifications of the game described herein, including providing for the play of the game in other than a video arcade media, will occur to those skilled in the art. It is intended in the appended claims to cover all such changes and modifications as fall within the true spirit and scope of the present invention.

What is claimed as new and desired to be secured by Letters Patent is:

1. A game involving the elimination of images in matching sets comprising:
   means for displaying a plurality of sets of matching images;
   each of the images having separable mating components;
   player controllable means for selecting one image at a time;
   means for retaining a first selected image for a perceptible predetermined time interval;
   means for comparing a second selected image with the first selected image;
   means for eliminating matching first and second selected images;
   means for producing a mixed image of exchanged components of the first and the second images if they do not match; and
   means for terminating the predetermined time interval upon player selecting the second image.

2. The game of claim 1 in which the player's selection of the first image activates the predetermined time interval.

3. The game of claim 1 in which the duration of the predetermined time interval is indicated by player perceptible signal means.

4. The game of claim 3 in which the signal means includes a variation of the first selected image.

5. The game of claim 1 including a succession of rounds with mixed images being initially displayed in later rounds.

6. The game of claim 1 including:
   a video display screen;
   generating means for generating the display of the images; and
   memory means for retaining the first selected image for the predetermined time.

7. The game of claim 6 including:
   means for generating a playing field;
   means for moving the images on the playing field;
   means for determining the identity and position of the images;
   means for generating a player controllable selector image for movement on the playing field; and
   the player controllable means including means for directing the player controllable picture on the playing field.

8. The game of claim 7 in which the player controllable selector is a shooter and including means for generating a projectile image emanating from the shooter.

9. The game of claim 8 in which the player controllable means includes:
   first manual control means for directing the speed and direction of movement of the shooter; and
   second manual control means for directing the frequency of appearance and direction of movement of the projectile.

10. An electronic video game comprising:
    means for generating a plurality of sets of matching target images having exchangeable first and second components;
    means for generating a moving projectile image;
    means for identifying each of the target images;
    player operable control means for directing the occurrence of the projectile image;

means for detecting an initial impact between the projectile image and a target image;

means for recording the initial impact and the identity of the target image as an initial hit for a predetermined time interval;

means for distinguishing a subsequent impact between the projectile image and a target image as a subsequent hit during the predetermined time interval;

means for comparing the identity of the subsequent hit target image with the recorded identity of the first hit target image; and means for producing resultant images upon resolving whether the identities of the hit target images match.

11. The game of claim 10 including means to depict a consequential image upon detecting an initial impact.

12. The game of claim 11 including means to continue depicting the consequential image if the initial hit target image is the subsequently hit target.

13. The game of claim 11 in which the consequential image is depicted throughout the predetermined time interval.

14. The game of claim 11 in which the recordation of the initial impact and the depiction of the consequential image are terminated if a subsequent impact of another target is distinguished during the predetermined time interval.

15. The game of claim 10 in which the resultant images include the disappearance of matching hit target images.

16. The game of claim 10 in which the resultant images include different forms of target images.

17. The game of claim 10 including:
means for generating a playing field image;
means for generating a shooter image on the playing field;
the player operated control means dictating the location of the shooter image on the playing field;
means for moving the target images on the playing field in prepatterned paths;
means for discerning encounters between the shooter image and a target image; and
means for showing an ensuing image upon discerning an encounter.

18. The game of claim 17 including means for immobilizing the initially hit target image during the predetermined interval.

19. The game of claim 17 in which:
each of the target images is movable in a plurality of prepatterned paths; and
means are included for randomly selecting a prepatterned path for each target image for a preset time.

20. The game of claim 19 including means for randomly electing a preset time.

21. The game of claim 17 in which:
the projectile image emanates from the shooter image; and
the player operated control means includes means for regulating the direction of movement of the projectile image.

22. The game of claim 17 including means for generating succeeding racks of play each involving the matching of target images and in which the playing field image includes a background comprising a series of progressively closer views of a scene beginning with a view of an entrance into an enclosure and ending with a view from within the enclosure again showing the entrance through an exit from the enclosure.

23. An electronic video game comprising:

means for generating a plurality of sets of matching target images;
means for generating a moving projectile image;
means for identifying each of the target images;
player operable control means for directing the occurrence of the projectile image;
means for detecting an initial impact between the projectile image and a target image;
means for recording the initial impact and the identity of the target image as an initial hit for a predetermined time interval;
means for distinguishing a subsequent impact between the projectile image and a target image as a subsequent hit during the predetermined time interval;
means for comparing the identity of the subsequent hit target image with the recorded identity of the first hit target image;
means for producing resultant images upon resolving whether the identities of the hit target images match;
initially mating first and second components for the target images;
means for mixing the first and second components of the target images; and
the resultant images include mixed images if the hit target images do not match.

24. The game of claim 23 in which the resultant images include different forms of target images.

25. The game of claim 23 including:
means for moving the target images; and
means for immobilizing the initially hit target images during the predetermined interval.

26. The game of claim 10 including means limiting the occurrence of projectile images.

27. The game of claim 26 in which the occurence of projectile images is limited to one projectile image at a time.

28. A method of generating a video game display and controlling the play of a game on a video display in response to the operation of player controls comprising:
generating video display data transformable by said display into a video display including a playing field image, a player controllable shooter image, a player actuable projectile image, and a plurality of matching pairs of target images having separable components;
adjusting the video display data in response to manual operation of the player controls to position the player controllable shooter image on the playing field;
generating data for random control of the occurrence and movement of the target images;
generating data defining movement of a projectile image along a preselected path in response to actuation of the player controls;
detecting impact of a projectile image with a target image and registering a hit upon detecting the impact;
identifying the hit target image;
determining whether there have been any prior hits of target images within a predetermined time;
comparing the hit target with any prior hit target within the predetermined time for the same components;
producing a first result upon detecting a match; and
producing a second result including the exchange of components upon detecting a mismatch.

29. The method of claim 28 including the step of generating data stopping the movement of the first hit target image for the predetermined time.

* * * * *